(12) United States Patent
Zhao et al.

(10) Patent No.: US 11,828,432 B2
(45) Date of Patent: Nov. 28, 2023

(54) LIGHT-GUIDING ASSEMBLY, VEHICLE LAMP, AND VEHICLE

(71) Applicant: VALEO VISION, Bobigny (FR)

(72) Inventors: Yakun Zhao, Bobigny (FR); Piao Zhang, Bobigny (FR); Xiaoyong Zhu, Bobigny (FR); Xiao Ning, Bobigny (FR); Huai Shu, Bobigny (FR); Fanrui Wu, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/637,165

(22) PCT Filed: Aug. 13, 2020

(86) PCT No.: PCT/EP2020/072819
§ 371 (c)(1),
(2) Date: Feb. 22, 2022

(87) PCT Pub. No.: WO2021/037587
PCT Pub. Date: Mar. 4, 2021

(65) Prior Publication Data
US 2022/0307670 A1 Sep. 29, 2022

(30) Foreign Application Priority Data
Aug. 28, 2019 (CN) .......................... 201910806052.0

(51) Int. Cl.
*F21S 43/239* (2018.01)
*F21S 43/31* (2018.01)
(Continued)

(52) U.S. Cl.
CPC ............ *F21S 43/239* (2018.01); *F21S 43/26* (2018.01); *F21S 43/31* (2018.01); *G02B 6/0025* (2013.01);
(Continued)

(58) Field of Classification Search
CPC .. F21S 41/26; F21S 43/14; F21S 43/15; F21S 43/239; F21S 43/241; F21S 43/26;
(Continued)

(56) References Cited

U.S. PATENT DOCUMENTS 7,224,501 B2 * 5/2007 Kojima ................ G02B 6/0038
362/602
7,431,481 B2 10/2008 Stefanov
(Continued)

FOREIGN PATENT DOCUMENTS

CN 109519858 * 3/2019 ................ F21V 7/00
DE 102012112076 A1 6/2014
(Continued)

OTHER PUBLICATIONS

English Machine Translation of CN 109519858 provided by ESPACENET (Year: 2019).*
(Continued)

*Primary Examiner* — Zheng Song
(74) *Attorney, Agent, or Firm* — Valeo Vision

(57) ABSTRACT

The present invention relates to a light-guiding assembly having a first light-guiding element, which is allocated to a first light source and used to receive and guide light from the first light source, and is provided with a first light incidence portion, a first light exit portion, and a first intermediate optical portion that is arranged between them. A second light-guiding element, which is allocated to a second light source and used to receive and guide light from the second light source, and is provided with a second light incidence portion, a second light exit portion, and a second intermediate optical portion that is arranged between them. Wherein the first light exit portion faces the second intermediate optical portion, and light leaving the first light exit portion
(Continued)

can pass through the second intermediate optical portion and exit from the second light exit portion.

20 Claims, 2 Drawing Sheets

(51) Int. Cl.
  *F21S 43/20* (2018.01)
  *F21V 8/00* (2006.01)
(52) U.S. Cl.
  CPC ......... *G02B 6/0055* (2013.01); *G02B 6/0075* (2013.01); *F21V 2200/20* (2015.01)
(58) Field of Classification Search
  CPC .... F21S 43/31; F21V 2200/20; G02B 6/0025; G02B 6/0055; G02B 6/0075
  See application file for complete search history.

(56) References Cited

U.S. PATENT DOCUMENTS

| | | | | |
|---|---|---|---|---|
| 7,857,495 | B2* | 12/2010 | Misawa | F21S 43/249 |
| | | | | 362/621 |
| 11,415,286 | B2* | 8/2022 | Takenaga | F21S 43/249 |
| 2006/0067090 | A1* | 3/2006 | Lee | G02B 6/4214 |
| | | | | 348/E9.027 |
| 2006/0209417 | A1 | 9/2006 | Kojia | |
| 2009/0027911 | A1 | 1/2009 | Misawa et al. | |
| 2014/0299752 | A1* | 10/2014 | Huang | G01J 1/0425 |
| | | | | 362/327 |
| 2016/0138772 | A1* | 5/2016 | Sato | G02B 6/0046 |
| | | | | 362/511 |

FOREIGN PATENT DOCUMENTS

| | | | |
|---|---|---|---|
| DE | 102014110347 | * 1/2016 | |
| DE | 102017119500 A1 | 2/2019 | |
| EP | 0940625 A2 | 9/1999 | |
| EP | 1684002 A2 | 7/2006 | |
| EP | 2161494 A1 | 3/2010 | |
| EP | 3112216 A1 | 1/2017 | |
| IT | 3671019 | * 6/2020 | ........... B60Q 1/0058 |
| JP | 2017195147 | * 10/2017 | ............ F21S 43/315 |

OTHER PUBLICATIONS

English Machine Translation of DE 102017119500 provided by ESPACENET (Year: 2017).*
European Patent Office, International Search Report and Written Opinion of corresponding International Application No. PCT/EP2020/072819, dated Nov. 25, 2020.

* cited by examiner

LIGHT-GUIDING ASSEMBLY, VEHICLE LAMP, AND VEHICLE

CROSS-REFERENCE TO RELATED APPLICATIONS

This application is filed under 35 U.S.C. § 371 U.S. National Phase of International Application No. PCT/EP2020/072819 filed Aug. 13, 2020 (published as WO2021/037587), which claims priority benefit to Chinese application No. 201910806052.0 filed on Aug. 28, 2019, the disclosures of which are herein incorporated by reference in their entirety.

TECHNICAL FIELD

The present invention relates to a light-guiding assembly, a vehicle lamp, and a vehicle.

BACKGROUND OF THE INVENTION

Various vehicle lamps known in the prior art are provided with the light-guiding assemblies and the light sources, which can act together to achieve pre-defined light distribution, thereby implementing pre-defined lighting/signal indication functions.

For example, a lighting device for a motor vehicle known from EP2161494 comprises a plurality of types of light-emitting components that can perform various light functions in the lighting device. The lighting device is further provided with at least one light-guiding body, and light emitted by each light-emitting component is coupled, operating together, into the light-guiding body. The light-guiding body has at least one light exit area, so that different light functions can be provided by the light exit area. Herein, light-emitting components for performing various light functions are arranged on the same light-emitting component carrier.

In the above-described lighting device, the utilization of light emitted by the light-emitting components that share the same light coupling surface is relatively low.

BRIEF SUMMARY OF THE INVENTION

An objective of the present invention is to provide a light-guiding assembly that can solve, at least partially, the above-described problem by a simple structure.

According to the present invention, a light-guiding assembly is disclosed, comprising: a first light-guiding element, which is allocated to a first light source and used to receive and guide light from the first light source, wherein the first light-guiding element is provided with a first light incidence portion, a first light exit portion, and a first intermediate optical portion that is arranged between the first light incidence portion and the first light exit portion in a main guiding direction of light from the first light source in the first light-guiding element, light from the first light source being guided in a deflective manner towards the first light exit portion by the first intermediate optical portion; and a second light-guiding element, which is allocated to a second light source and used to receive and guide light from the second light source, wherein the second light-guiding element is provided with a second light incidence portion, a second light exit portion, and a second intermediate optical portion that is arranged between the second light incidence portion and the second light exit portion in a main guiding direction of light from the second light source in the second light-guiding element, light from the second light source being guided in a deflective manner towards the second light exit portion by the second intermediate optical portion, and wherein the first light exit portion faces the second intermediate optical portion, and the light leaving the first light exit portion can be coupled into the second light-guiding element through the second intermediate optical portion, and exit from the second light exit portion.

According to an embodiment, a light diffusion structure is arranged in the second light exit portion.

According to an embodiment, the first intermediate optical portion is provided with a first reflecting region and a first spacing region that are arranged alternately with each other in steps, and the second intermediate optical portion is provided with a second reflecting region and a second spacing region that are arranged alternately with each other in steps, wherein the first reflecting region and the second reflecting region are arranged so as to reflect light towards the second light exit portion, and wherein light reflected by the first reflecting region can pass through the second spacing region and travel towards the second light exit portion.

According to an embodiment, at least a surface of the first light exit portion where the light reflected by the first reflecting region reaches is perpendicular to the main guiding direction of the light and is parallel to the second spacing region.

According to an embodiment, the first reflecting region, the second reflecting region, and the second spacing region are strip-shaped surfaces.

According to an embodiment, the first light-guiding element is divided into at least one first segment arranged side by side, wherein the first light incidence portion in the form of a first light-collimating structure is arranged at an end of the first segment, and the second light-guiding element is divided into at least one second segment arranged side by side, wherein the second light incidence portion in the form of a second light-collimating structure is arranged at an end of the second segment, and the first light-collimating structure and the second light-collimating structure are allocated to the corresponding light sources, and are used to collimate incident light into parallel light.

According to an embodiment, the first segment and/or the second segment are arranged side by side at least partially offset.

According to an embodiment, a first light-guiding section is formed between the first light incidence portion and the first intermediate optical portion, a second light-guiding section is formed between the second light incidence portion and the second intermediate optical portion, and a third light-guiding section is formed between the second light exit portion and the second intermediate optical portion, wherein the first light-guiding section, the second light-guiding section, and the third light-guiding section have a length of at least 20 mm.

According to an embodiment, the first light-guiding section and the second light incidence portion have the same length and are arranged close to each other.

According to an embodiment, extension of the third light-guiding section corresponds to the main guiding direction of light in the third light-guiding section.

The present invention further discloses a vehicle lamp that comprises a light source and the above-described light-guiding assembly, the light source being allocated to the light-guiding assembly.

According to an embodiment, the first light-guiding element and the second light-guiding element of the light-guiding assembly are respectively allocated to different light sources that emit different light. Herein, wording different can be understood to mean that light emitted by the light sources has different color or different brightness, thereby achieving pre-defined light distribution.

According to an embodiment, different sub-light sources are arranged on the same carrier.

According to an embodiment, the vehicle lamp can implement functions of a daytime running lamp, a position lamp, a turn indicator lamp, and a brake lamp.

The present invention further discloses a vehicle that comprises the above-described vehicle lamp.

By the above-described solution provided by the present invention, different light distributions using the same light exit area are achievable, especially in a lamp for a motor vehicle, thereby implementing pre-defined light functions while improving the utilization of light emitted by a light source.

BRIEF DESCRIPTION OF THE DRAWINGS

The present invention will be described in greater detail below with reference to the drawings. In the drawings.

DETAILED DESCRIPTION OF THE INVENTION

Embodiments of the present invention will be described demonstratively below. As those skilled in the art should realize, the embodiments described can be modified in various different ways without departing from the concept of the present invention. Thus, the drawings and the description are in essence exemplary and non-limiting. In the following text, the same reference sign generally indicates elements with the same or similar function.

Figure 1:
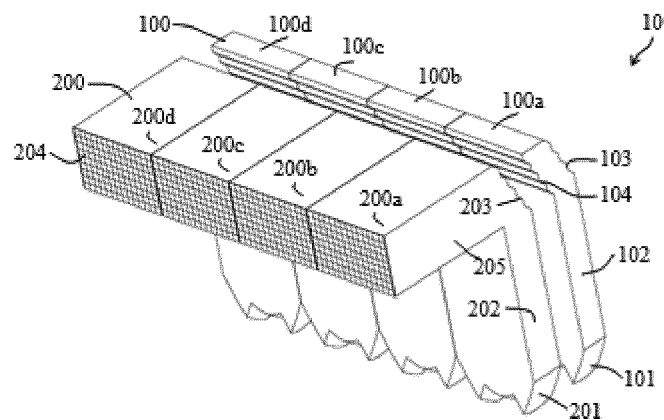
FIG. 1 schematically shows a perspective view of an embodiment of a light-guiding assembly according to the present invention.
Figure 2:
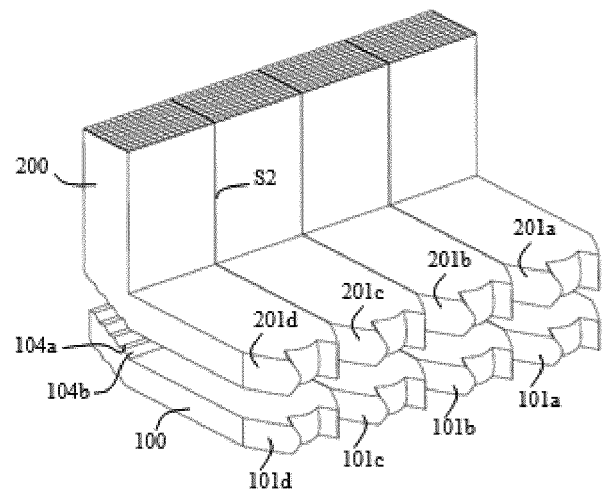
FIG. 2 schematically shows another perspective view of the light-guiding assembly in FIG. 1.
Figure 3:
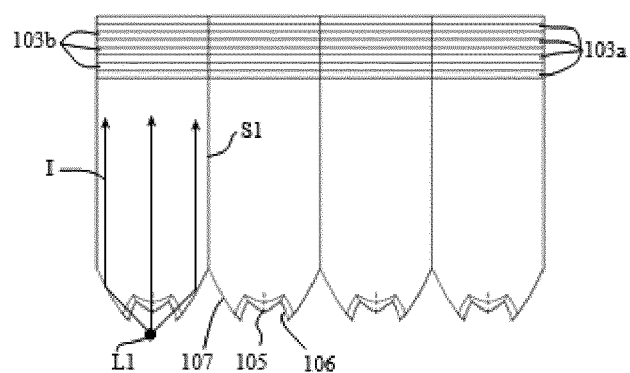
FIG. 3 schematically shows a rear view of the light-guiding assembly in FIG. 1.

FIG. 1, FIG. 2, and FIG. 3 respectively show a different view of an embodiment of a light-guiding assembly 10 according to the present invention. The light-guiding assembly 10 is provided with a first light-guiding element 100 and a second light-guiding element 200, which are respectively block-shaped and allocated to corresponding light sources. A main guiding direction of light emitted by the light source in the light-guiding assembly 10 is indicated by the arrows in FIG. 4. The light-guiding assembly will be described in detail below.

The first light-guiding element 100 is allocated to a first light source L1 and is used to receive and guide light from the first light source. The first light-guiding element is provided with a first light incidence portion 101, a first light exit portion 104, and a first intermediate optical portion 103 that is arranged between the first light incidence portion 101 and the first light exit portion 104 in the main guiding direction of light from the first light source in the first light-guiding element, light from the first light source being guided in a deflective manner towards the first light exit portion 104 by the first intermediate optical portion 103. It is clear that the first light incidence portion 101 and the first light exit portion 104 are not arranged directly facing each other. A first light-guiding section 102 of the first light-guiding element 100 is formed between the first light incidence portion 101 and the first light exit portion 104.

In order to achieve deflection of light towards the first light exit portion 104, the first intermediate optical portion 103 is, at least partially, provided with a reflecting region. Herein, the reflecting region is a total reflecting surface for reflecting light arriving here towards the first light exit portion 104. In the illustrated example, the first intermediate optical portion 103 is provided with a first reflecting region 103a and a first spacing region 103b that are arranged alternately with each other in steps, wherein the corresponding first reflecting regions are parallel to each other, and the corresponding first spacing regions are parallel to each other. The first spacing region 103b can be parallel to the main guiding direction of light in the first light-guiding section 102. The first reflecting region 103a is inclined with respect to the first spacing region 103b. For example, an angle formed between the first reflecting region 103a and the first spacing region 103b is in a range of 130° to 150°, preferably 135°, thereby ensuring that light reaching the first reflecting region here meets the condition for total reflection here.

Alternatively, the first reflecting region 103a can also be implemented by applying a reflecting layer, for example, a metallic paint layer. In such a case, the inclination of the first reflecting region 103a relative to the first spacing region 103b can be set as required.

Herein, especially when the first spacing region is parallel to the main guiding direction of light in the first light-guiding section 102, the size of the first spacing region can be set according to the desired light exit width, thereby allowing the size of the width of the first light exit portion 104 to be different from that of the first light incidence portion 101, especially allowing the size of the width of the first light exit portion 104 to be larger than that of the first light incidence portion 101. Thus, the thickness of the first light-guiding element 100 can be reduced to decrease the weight of the first light-guiding element.

The first light exit portion 104 is designed such that at least its surface where light reflected by the first reflecting region 103a reaches is perpendicular to the main guiding direction of the light, so as to achieve the optimal guiding of light, which will be further explained below with reference to a second light-guiding element. The first light exit portion 104 can be designed similarly to the first intermediate optical portion 103, that is, it is provided with another light transmitting region 104a and another spacing region 104b that are arranged alternately with each other in steps. Preferably, said another spacing region 104b is perpendicular to the main guiding direction of light. Alternatively, the first light exit portion 104 can be a plane perpendicular to the main guiding direction of light, which is not shown in the drawings.

The first light-guiding element 100 can be divided into at least one first segment arranged side by side. In the shown example, the first light-guiding element 100 is provided with four first segments 100a, 100b, 100c, and 100d. For the sake of clarity, FIG. 3 shows a dividing line S1 between the segments. It should be noted that the dividing line S1 is in fact not necessarily visible, especially when the segments are arranged linearly. Herein, the first light incidence portion 101 in the form of a first light-collimating structure 101a, 101b, 101c, and 101d is provided at an end of the corresponding first segment, each light-collimating structure being allocated to a light source L1. Herein, the light-collimating structure can be designed according to the type of the light source, so as to realize that a light beam I coupled into the first light-guiding section 102 is a parallel light beam to the greatest extent. The corresponding first light-collimating structure comprises a first light coupling surface 105, a second light coupling surface 106 located on both sides of the first light coupling surface 105, and a reflecting surface 107 that is adjacent to the corresponding second light coupling surface 106. The first light coupling surface 105 and the second light coupling surface 106 are convex surfaces that protrude towards the light source L1, used to collimate the light beam I emitted by the light source in a thickness direction of the first light-guiding element, namely, a direction perpendicular to the paper surface on which the sheet of FIG. 3 is located, thereby allowing transformation of a divergent conical light beam emitted by the light source into a light beam extending between two sides that limit the thickness of the first light-guiding element. Light emitted by the light source passing through the centered first light coupling surface 105 is directly adjusted so as to travel in the first light-guiding section 102 in the main guiding direction, and light passing through the second light coupling surfaces 106 on both sides and reaching the reflecting surfaces 107 is reflected thereby, so as to travel in the first light-guiding section 102 in the main guiding direction. Herein, the reflecting surface 107 can be a paraboloid, the focal point of which coincides with the focal points of the convex light coupling surfaces 105 and 106, a light source being arranged at the focal points.

From the drawings, it is also clear that the first reflecting region 103a is a strip-shaped surface for achieving the optimal light reflection effect.

The second light-guiding element 200 is allocated to a second light source L2, and is used to receive and guide light from the second light source. The second light-guiding element is provided with a second light incidence portion 201, a second light exit portion 204, and a second intermediate optical portion 203 that is arranged between the second light incidence portion 201 and the second light exit portion 204 in the main guiding direction of light from the second light source in the second light-guiding element, light from the second light source being guided in a deflective manner towards the second light exit portion 204 by the second intermediate optical portion 203. It is clear that the second light incidence portion 201 and the second light exit portion 204 are not arranged directly opposite to each other. Therefore, a second light-guiding section 202 that is formed between the second light incidence portion 201 and the second intermediate optical portion of the second light-guiding element 200 and a third light-guiding section 205 that is formed between the second intermediate optical portion 203 and the second light exit portion 204 make a non-zero included angle.

The second intermediate optical portion 203 is provided with a second reflecting region 203a and a second spacing region 203b that are arranged alternately with each other in steps, wherein the corresponding first reflecting region is parallel to each other, and the corresponding first spacing region is parallel to each other. The second spacing region 203b can be parallel to the main guiding direction of light in the second light-guiding section 202. The second reflecting region 203a is inclined with respect to the second spacing region 203b. For example, an angle formed between the second reflecting region 203a and the second spacing region 203b is in a range of 130° to 150°, preferably 135°, thereby ensuring that light reaching the second reflecting region meets the conditions for total reflection here.

The second spacing region 203b is further parallel to the surface of the first light exit portion 104 through which light from the light source L1 passes, which enables light exiting the first light exit portion 104 in a direction perpendicular to it to reach the second spacing region 203b with a perpendicular incidence, thereby ensuring that light is properly guided and that a simple design is achievable. Of course, the first light exit portion 104 and the second spacing region can be designed in combination such that the main guiding direction of light coupled in through the second spacing region in the third light-guiding section 205 of the second intermediate optical portion 203 is consistent with that of light reflected by the second reflecting regions 203a in the third light-guiding section 205.

Herein, especially when the second spacing region is parallel to the main guiding direction of light in the second light-guiding section 202, the size of the second spacing region can be set according to the desired light exit width, thereby allowing the size of the width of the second light exit portion 204 to be different from that of the second light incidence portion 201, especially allowing the size of the width of the second light exit portion 204 to be larger than that of the second light incidence portion 201. Thus, the thickness of the second light-guiding element 200 can be reduced to decrease the weight of the second light-guiding element.

A light diffusion structure, for example the shown pillow-like array structure, can be arranged in the second light exit portion 204. Of course, a diffusion structure in any other forms, for example a strip-shaped light diffusion structure, is also feasible.

The second light-guiding element 200 can be divided into at least one second segment arranged side by side. In the shown example, the second light-guiding element 200 is provided with four second segments 200a, 200b, 200c, and 200d. For the sake of clarity, FIG. 2 shows a dividing line S2 between the segments. It should be noted that the dividing line S2 is in fact not necessarily visible, especially when the segments are arranged linearly with each other. Herein, the second light incidence portion 201 in the form of a second light-collimating structure 201a, 201b, 201c, and 201d is arranged at an end of the corresponding second segment, each light-collimating structure being allocated to a light source L2. Herein, a light-collimating structure can be designed according to the type of a light source, so as to realize a light beam II coupled into the second light-guiding section 202 is a parallel light beam to the greatest extent. The corresponding second light-collimating structure can be designed similarly to the first light-collimating structure. In this connection, reference can be made to the description provided above, and no description thereof will be provided again.

The second reflecting region 203a and the second spacing region 203b of the second intermediate optical portion 203 of the second light-guiding element 200 are also strip-shaped surfaces for achieving the optimal light guiding effect.

A travel route of light in the first light-guiding element 100 and the second light-guiding element 200 will be explained below with reference to FIG. 4.

Figure 4:
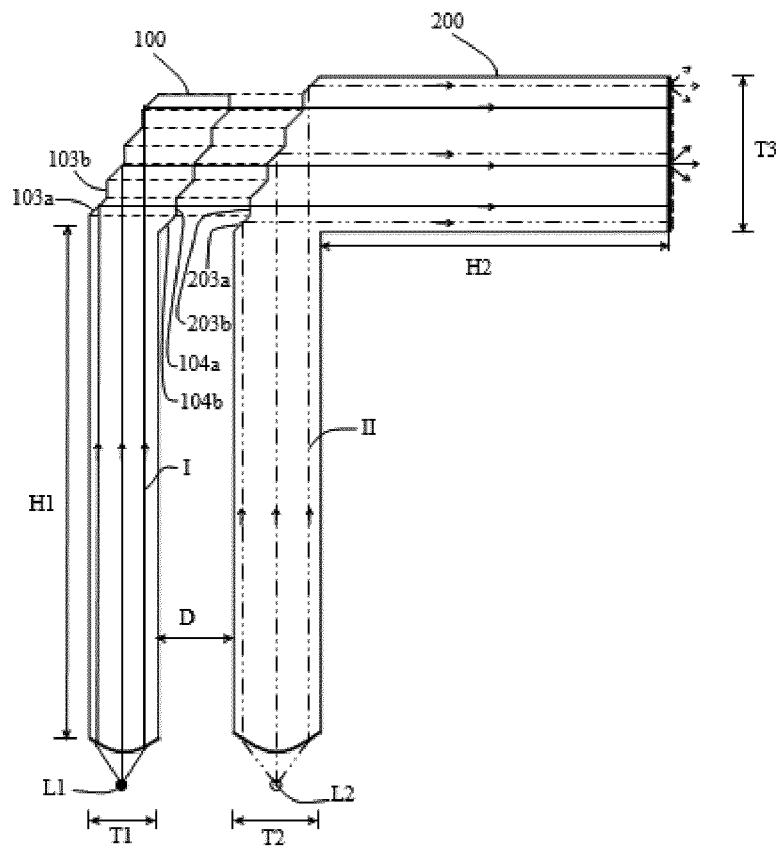
FIG. 4 schematically shows a light path of light in the light-guiding assembly in FIG. 1.

As can be seen from FIG. 4, light emitted by the first light source L1 allocated to the first light-guiding element 100 is, as collimated, coupled in from the first light incidence portion 101, reaches, as guided by the first light-guiding section 102, the first reflecting region 103a of the first intermediate optical portion 103, is reflected here towards the first light exit portion 104, leaves the first light exit portion 104, especially its light transmitting region 104a, reaches the second spacing region 203b of the second light-guiding element 200, reaches the second light exit portion 204 after passing through the second spacing region 203b, and leaves the light-guiding assembly through the second light exit portion 204. The main guiding direction of light from the first light source L1 is indicated by solid lines with arrows.

Light emitted by the second light source L2 allocated to the second light-guiding element 200 is, as collimated, coupled in from the second light incidence portion 201, reaches, as guided by the second light-guiding section 202, the second reflecting region 203a of the second intermediate optical portion 203, is reflected here towards the second light exit portion 204, reaches, as guided by the third light-guiding section 205, the second light exit portion 204, and finally leaves the light-guiding assembly. The main guiding direction of light from the second light source L2 is indicated by dotted lines with arrows.

It is clear that the first light exit portion 104 faces the second intermediate optical portion 203, and light leaving the first light exit portion 104 can pass through the second intermediate optical portion 203 and exit from the second light exit portion 204.

When the first light source L1 and the second light source L2 can emit light having different optical characteristics, for example, when they have different refractive indexes in the same medium, the first reflecting region 103a of the first intermediate optical portion 103 and the second reflecting region 203a of the second intermediate optical portion 203 can be configured accordingly; thus, when the first light-guiding section and the second light-guiding section are arranged parallel to each other, the first reflecting region and the second reflecting region can have different inclination angles; this allows the main guiding directions of reflected light from the two types of light sources to be as consistent with each other as possible, thereby achieving the optimal light guiding and light distribution.

Preferably, the main guiding direction of light emitted by the two types of light sources in the third light-guiding section corresponds to an extension direction of the third light-guiding section.

In order to achieve a good light mixing effect, the lengths H1 and H2 of the first light-guiding section, the second light-guiding section, and the third light-guiding section are at least 20 mm. The first light-guiding section and the second light-guiding section can have the same length, and thus the corresponding light sources can be arranged on the same light source carrier, for example, a printed circuit board. Although the drawing shows a distance D between the first light-guiding section and the second light-guiding section, the distance D can be zero. The thicknesses T1, T2, and T3 of the first light-guiding section, the second light-guiding section, and the third light-guiding section can be selected as required, for example, on the basis of a light-emitting cone angle of the selected light source or on the basis of a required light exit area and so on.

The first light-guiding element 100 and the second light-guiding element 200 can be made of the same material, for example, polycarbonate (PC), polymethyl methacrylate (PMMA), glass, etc., by casting. The first light-guiding element 100 and the second light-guiding element 200 can be molded separately and connected to each other by a holder.

Although the first light-collimating structure and the second light-collimating structure can have substantially the same shape, they can be designed separately, especially considering characteristics (for example, refractive indexes of light in the same medium), quantities, etc. of light sources, thereby achieving the best possible collimation and light exit effect.

Figure 5:
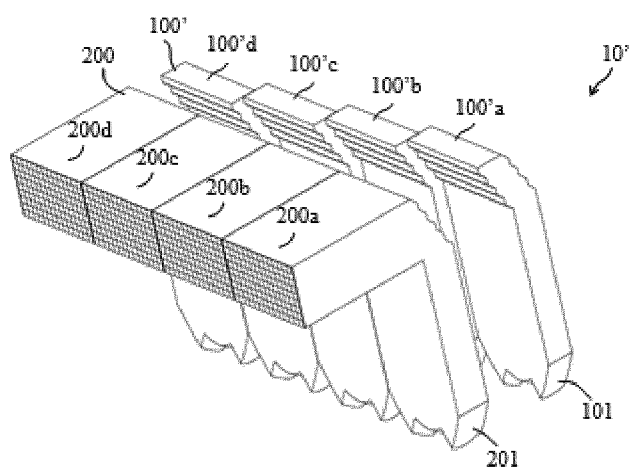
FIG. 5 schematically shows a perspective view of another light-guiding assembly according to the present invention.

FIG. 5 shows another embodiment of a light-guiding assembly 10' according to the present invention. In this embodiment, different from the linearly arranged first segments 100a, 100b, 100c, and 100d of the above-described first light-guiding element 100, the first segments of the first light-guiding element 100' are arranged offset from each other to match the actual structural space. Of course, the second segments of the second light-guiding element can also be arranged offset from each other.

The present invention further discloses a vehicle lamp that comprises a light source and the above-described light-guiding assembly, the light source being allocated to the light-guiding assembly.

The first light-guiding element and the second light-guiding element of the light-guiding assembly are respectively allocated to the different sub-light sources that emit different light. For example, a first sub-light source can emit white light having an adjustable brightness, and a second sub-light source can emit yellow light, so the vehicle lamp can perform the functions of a daytime running lamp, a position lamp, and a turn indicator by the same light exit area. When a light source capable of emitting red light is adopted, the function of a brake lamp can also be realized.

Different sub-light sources can be arranged on the same carrier.

The present invention further discloses a vehicle that comprises the above-described vehicle lamp.

The present invention is not limited to the above-described structure, and other various variants can be adopted. Although the present invention has been described in a limited number of embodiments, benefiting from the present invention, those ordinary skilled in the art can design other embodiments without departing from the protection scope of the present invention. Thus, the protection scope of the present invention should be defined only by the appended claims.

What is claimed is:
1. A light-guiding assembly, comprising:
a first light guide, which is allocated to a first light source and configured to receive and guide light from the first light source, wherein the first light guide is provided with a first light incidence portion,
a first light exit portion, and
a first intermediate optical portion that is arranged between the first light incidence portion and the first light exit portion in a main guiding direction of light from the first light source in the first light-guide;
wherein the first intermediate optical portion includes a first reflecting region and a first spacing region that are arranged alternately with each other in steps;
a light from the first light source being guided in a deflective manner towards the first light exit portion by the first intermediate optical portion; and
a second light guide, which is allocated to a second light source and used configured to receive and guide a light from the second light source, wherein the second light guide is provided with a second light incidence portion, a second light exit portion; and
a second intermediate optical portion arranged between the second light incidence portion and the second light exit portion in a main guiding direction of the light from the second light source in the second light guide;

the second intermediate optical portion includes a second reflecting region and a second spacing region arranged alternately with each other in steps;

the light from the second light source adapted to be guided in a deflective manner towards the second light exit portion by the second intermediate optical portion;

wherein the first reflecting region, the second reflecting region and the second spacing region are strip-shaped surfaces; and the first light exit portion faces the second intermediate optical portion, such that light leaving the first light exit portion is configured to be coupled into the second light-guide through the second intermediate optical portion and exit from the second light exit portion.

2. A vehicle lamp with a light source and the light-guiding assembly according to claim 1, where the light source is allocated to the light-guiding assembly.

3. The vehicle lamp according to claim 2, wherein the first light-guide and the second light guide of the light-guiding assembly are respectively equipped with different light sources that emit different light.

4. The vehicle lamp according to claim 3, wherein the different light sources are arranged on a same carrier.

5. The vehicle lamp according to claim 4, wherein the vehicle lamp is configured to perform functions of a daytime running lamp, a position lamp, a turn indicator, or a brake indicator lamp.

6. A vehicle including the vehicle lamp according to claim 5.

7. The light-guiding assembly according to claim 1, wherein the second light exit portion includes a light diffusion structure.

8. The light-guiding assembly according to claim 7, wherein the first reflecting region and the second reflecting region are arranged so as to reflect light towards the second light exit portion, and wherein light reflected by the first reflecting regions can pass through the second spacing regions and travel towards the second light exit portion.

9. The light-guiding assembly according to claim 8, where light reflected by the first reflecting region of at least a surface of the first light exit portion is perpendicular to the main guiding direction of the light and is parallel to the second spacing region.

10. The light-guiding assembly according to claim 1, wherein
a first light-guiding section is formed between the first light incidence portion and the first intermediate optical portion,
a second light-guiding section is formed between the second light incidence portion and the second intermediate optical portion, and
a third light-guiding section is formed between the second intermediate optical portion and the second light exit portion,
wherein the first light-guiding section, the second light-guiding section, and the third light-guiding section have a length of at least 20 mm.

11. The light-guiding assembly according to claim 10, wherein the first light-guiding section and the second light incidence portion have a same length and are arranged proximate to each other.

12. The light-guiding assembly according to claim 10, wherein an extension of the third light-guiding section corresponds to the main guiding direction of light in the third light-guiding section.

13. The light-guiding assembly according to claim 1, wherein the first light-guide is divided into a number of first segments arranged side by side, wherein a first light incidence portion in the form of a first light-collimating structure is arranged at an end of each of the number of first segments, the second light guide is divided into a number of second segments arranged side by side, wherein a second light incidence portion in the form of a second light-collimating structure is arranged at an end of each of the number of second segments, and the first light-collimating structures and the second light-collimating structure are allocated to the corresponding light sources, and are used to collimate incident light into parallel light.

14. The light-guiding assembly according to claim 13, wherein the first segments and the second segments are arranged side by side at least partially offset.

15. A light-guiding assembly of a motor vehicle, comprising:
a first light-guide configured to receive and guide light from a first light source, wherein the first light-guide is provided with a first light incidence portion, a first light exit portion and a first intermediate optical portion;
the first intermediate optical portion arranged between the first light incidence portion and the first light exit portion in a main guiding direction of light from the first light source in the first light-guide;
wherein the first intermediate optical portion includes a first reflecting region and a first spacing region arranged alternately with each other in steps;
light from the first light source being guided in a deflective manner towards the first light exit portion by the first intermediate optical portion; and
a second light-guide, which is allocated to a second light source and configured to receive and guide light from the second light source, wherein the second light-guide is provided with a second light incidence portion, a second light exit portion; and
a second intermediate optical portion arranged between the second light incidence portion and the second light exit portion in a main guiding direction of light from the second light source in the second light-guide;
the second intermediate optical portion includes a second reflecting region and a second spacing region arranged alternately with each other in steps;
where the first reflecting region, the second reflecting region and the second spacing region are strip-shaped surfaces;
where light from the second light source being guided in a deflective manner towards the second light exit portion by the second intermediate optical portion; and
the first light exit portion faces the second intermediate optical portion such that light leaving the first light exit portion is configured to be coupled into the second light-guide through the second intermediate optical portion and exit from the second light exit portion.

16. The light-guiding assembly of claim 15, wherein the second light exit portion includes alight diffusion structure.

17. The light-guiding assembly of claim 15, wherein the first reflecting region and the second reflecting region are arranged so as to reflect light towards the second light exit portion, and wherein light reflected by the first reflecting region can pass through the second spacing region and travel towards the second light exit portion.

18. The light-guiding assembly of claim 15, where light reflected by the first reflecting region of at least a surface of the first light exit portion is perpendicular to the main guiding direction of the light and is parallel to the second spacing region.

19. The light-guiding assembly of claim 15, wherein the first light-guide and the second light-guide of the light-guiding assembly are respectively equipped with a number of different light sources that emit different light.

20. The light-guiding assembly of claim 19, wherein the different light sources are arranged on a same carrier.

* * * * *